United States Patent [19]

Paar et al.

[11] Patent Number: 4,857,581
[45] Date of Patent: Aug. 15, 1989

[54] CATIONIC PAINT BINDERS COMPRISING THE REACTION PRODUCT OF SUBSTITUTED UREAS, FORMALDEHYDE, AND PHENOLS

[75] Inventors: Willibald Paar, Graz; Anton Arzt, Leibnitz, both of Austria

[73] Assignee: Vianova Kunstharz, A.G., Werndorf, Austria

[21] Appl. No.: 133,436

[22] Filed: Dec. 15, 1987

[30] Foreign Application Priority Data

Dec. 15, 1986 [AT] Austria ................................ 3318/86

[51] Int. Cl.$^4$ ............................................. C08G 14/08
[52] U.S. Cl. ..................... 524/591; 524/593; 525/452; 525/504; 528/45; 528/68; 528/73; 528/78; 528/85; 528/164
[58] Field of Search ............... 528/164, 78, 68, 45, 528/85, 73; 525/452, 504, 591, 593

[56] References Cited

U.S. PATENT DOCUMENTS

| | | | |
|---|---|---|---|
| 4,590,245 | 5/1986 | Daimer et al. | 525/504 |
| 4,608,416 | 8/1986 | Schupp et al. | 525/130 |
| 4,711,934 | 12/1987 | Paar et al. | 525/452 |

*Primary Examiner*—Maurice J. Welsh
*Assistant Examiner*—L. Henderson
*Attorney, Agent, or Firm*—A. W. Breiner

[57] ABSTRACT

Cationic paint binders obtained through reaction of substituted ureas with formaldehyde and phenols are described. The substituted ureas are obtained through reaction of an isocyanate compound carrying at least one free, and optionally also blocked, NCO-group with equivalent quantities of a secondary non-aromatic amine. After partial protonation, the binders are used in water-dilutable paints, particularly in cathodically depositable electrodeposition paints.

28 Claims, No Drawings

CATIONIC PAINT BINDERS COMPRISING THE REACTION PRODUCT OF SUBSTITUTED UREAS, FORMALDEHYDE, AND PHENOLS

FIELD OF INVENTION

The present invention relates to cationic paint binders. More particularly the invention is concerned with cationic paint binders obtainable through reaction of substituted ureas with formaldehyde and phenols, and to the process of producing the binders.

BACKGROUND OF INVENTION

European Patent Application No. 86 109 853, corresponding to U.S. Ser. No. 887,934 filed July 22, 1986, U.S. Pat. No. 4,711,934 discloses cationic paint binders which are characterized by the schematic structure—

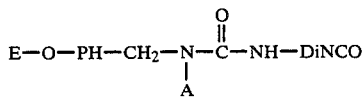

wherein
E—is the radical of an epoxy resin,
PH—is the radical of a phenol,
A—is the radical of an amine, and
DiNCO is the radical of a semi-blocked diisocyanate.
The products are produced through an aminoalkylation reaction of a phenol with a primary amine and subsequent reaction of the NH-group with a semi-blocked diisocyanate. The products are produced in a surprisingly simple manner and, upon protonation, result in water-dilutable binders for paints with good applicational properties, curing to satisfactorily crosslinked films at a stoving temperature of about 160° C.

SUMMARY OF INVENTION

It has now been found that the substituted ureas which are obtained by the reaction of a secondary amine with an isocyanate group can be condensed with formaldehyde and a phenol to provide highly desirable paint binders.

Accordingly, the present invention is concerned with a process for producing cationic paint binders water-dilutable on protonation by reacting substituted ureas with phenols and formaldehyde, characterized in that—
(A) an isocyanate compound having at least one free NCO-group, and optionally blocked NCO-groups, is reacted with a quantity equivalent to the free isocyanate groups of a secondary non-aromatic amine, which is preferably an aliphatic amine;
(B) the thus obtained substituted urea compound (A) is condensed with formaldehyde and a phenol and, optionally,
(C) the phenolic hydroxy groups of the condensate are totally or partially etherified with epoxy compounds.

The invention is also directed to the products produced according to the process of the invention and to water-dilutable paints containing the binders produced, particularly in cathodically depositable paints.

GENERAL DESCRIPTION OF INVENTION

Mono- or polyisocyanates can be used for the formation of substituted urea compounds useful in the present invention. The compounds must have at least one free NCO-group and, particularly for the formulation of self-crosslinking binders, the isocyanate can also contain blocked NCO-groups. The preferred isocyanates for use according to the invention are the diisocyanates and semi-blocked diisocyanates. The preferred blocked diisocyanates are prepared from diisocyanates wherein the NCO-groups have a different reactivity, such as toluylene diisocyanate or isophorone diisocyanate. The preferred blocking agents are aliphatic monoalcohols which, optionally in the presence of a catalyst, are split off under stoving conditions. Other blocking agents include the phenols, oximes, amines, unsaturated alcohols, carrolactame, etc. As used herein "polyisocyanate" as is customary includes the diisocyanates.

Suitable secondary non-aromatic amines include the dialkylamines such as diethylamine and its homologues. Additional amines which can be used are the triamines such as diethylenetriamine. Another group of suitable secondary amines are the secondary alkanolamines such as alkylalkanolamines, dialkanolamines or other beta-hydroxyamines as are obtained through reaction of monoalkyl- or monoalkanolamines with monoepoxy compounds or through MICHAEL-addition of acrylic acid esters with a primary amine substituted alkanediol. Corresponding reaction products of monoalkyl- and monoalkanolamines with di- or polyepoxy compounds as well as of diprimary diamines with monoepoxy compounds are also useful. According to the invention, other particularly useful amines are aminoethylethanolamine and 1-(2-aminoethyl)-piperazine, the primary amino groups of which are blocked as ketimines.

The isocyanate compound is reacted at from about 25° to 60° C. with the secondary amine, optionally in the presence of aprotic solvents, the secondary amino groups and the free isocyanate groups being used in equivalent quantities. Preferably, in this reaction, the isocyanate compound is added in portions to the precharged amine. Normally, the reaction is complete at the end of the addition. The substituted urea thus obtained, sill containing a hydrogen atom reactive with formaldehyde, is condensed in a second step with formaldehyde and a phenol. The source of formaldehyde preferably is paraformaldehyde in the commercially available forms having a $CH_2O$ content of from 85% to 100%.

As the phenol component, the preferred compounds are phenol, substituted phenols such as the monoalkyl phenols, aryl phenols, and aralkyl phenols. The most preferred compounds are the monoalkyl phenols with more than 4 C-atoms in the alkyl radical or diphenylolalkanes. Complex phenol components can also be used as long as they carry at least one formaldehyde-reactive site. Examples are corresponding phenol-aldehyde condensates or aminoalkylation products of phenols.

As will be apparent, the functionality of the components used according to this invention have to be adjusted in order that the reaction products, upon partial or total neutralization at least of the basic nitrogen atoms, are dilutable with water. In all cases the titratable basicity must correspond to an amine value of at least 20 mg KOH/g, and preferably at least about 35 mg KOH/g. The basic groups are introduced either through use of amines with amino groups blocked as ketimines, or with compounds carrying tertiary amino groups to block the isocyanate groups. The secondary amine used for the formation of the substituted urea may in addition contain tertiary amino groups.

The condensation of the substituted urea, the phenol component, and the formaldehyde is carried out at from about 60° to 120° C., the reaction water which is formed being entrained through azeotropic distillation with the aid of an entraining agent such as toluol or an aliphatic hydrocarbon. At the end of the reaction, the entraining agent is vacuum-stripped and the product is dissolved in an at least water-tolerant solvent suitable for further processing. The preferred solvents are glycol ethers, such as ethyleneglycolmono- or di- $C_1$–$C_4$-alkyl ethers or the corresponding propyleneglycol ethers.

Optionally, the phenolic hydroxy groups of the condensation product can be etherified in known manner with epoxy compounds. The mono- or polyepoxy (including diepoxy) compounds can be used in the etherification, such as the glycidyl esters or ethers of carboxylic acids and of polyols. The preferred monoepoxy compounds are the glycidyl esters of the so-called KOCH-acids and glycidyl ethers with long chain aliphatic hydrocarbon radicals. The preferred diepoxy compounds are the various available products based on bisphenol-A and epichlorohydrin. The etherification is carried out at from 80° to 120° C. Due to the basic character of the products, catalysts normally are not required. In selecting the epoxy compound, the functionality must be considered so as to obtain a product which is still water-dilutable.

In order to obtain water-dilutability, the basic groups of the binder are neutralized partially or totally with acids, preferably formic acid, acetic acid, or lactic acid. Normally, for practical use, a degree of neutralization of from 20% to 60% of the basic groups is sufficient, corresponding to a quantity of about 20 to 60 millimoles of acid per 100 g of resin solids. The binder is then diluted with deionized water to the desired degree of concentration. Optionally, prior to neutralization or dilution, or in partially diluted form, the binders are processed to pigmented paints with crosslinking catalysts, pigments, extenders, and other additives.

The formulation of the paints and processing thereof in the electrodeposition process are known to those skilled in the art and are described in the literature. The deposited coatings, when used as primers, are cured at temperatures of between 150° and 170° C. for about 10 to 30 minutes. Unless the binders afford a sufficient degree of crosslinking properties, additional crosslinkers may be coemployed, such as blocked isocyanates or amino resins or phenolic resins.

With appropriate formulation, the products of this invention may be applied by methods other than electrodeposition such as by dipping, roller coating, and spraying. Optionally, the binders may be processed with organic solvents.

PRESENTLY PREFERRED EMBODIMENTS

The following examples illustrate the invention without limiting its scope. Parts and percentages are by weight unless otherwise stated. Molar quantities refer to grams.

Example 1

267 parts (1 mole) of a diketimine of diethylenetriamine and methylisobutylketone (mole ratio 1 : 2) are reacted at 35° to 40° C., while cooling, with 304 parts (1 mole) of a toluylene diisocyanate semi-blocked with 2-ethylhexanol. In this reaction the isocyanate compound is continuously added within 90 minutes. At the end of the addition, the NCO-value has fallen to practically zero. 220 parts (1 mole) nonylphenol and 33 parts (1 mole) of paraformaldehyde (91% $CH_2O$) are added and the batch is heated to 80° C. The reaction water is entrained with azeotropic distillation, with the temperature slowly being raised to 120° C. After separation of the calculated quantity of reaction water, the entraining agent is vacuum-stripped and the batch is diluted to a solids content of 75% with methoxypropanol.

In order to etherify the phenolic hydroxy groups, the batch is blended with 679 parts (1 epoxy Val) of a 70% solution in diethyleneglycol dimethylether of an epoxy resin based on bisphenol-A and epichlorohydrin (epoxy equivalent weight about 475) and is reacted at 95° to 110° C. until all epoxy groups have been consumed. "Val" as used herein is the equivalent weight in grams for the designated functional group and, accordingly, is equivalent to groups.

A cathodically depositable clear binder solution is prepared using the etherified condensate through the addition of 65 milliMoles of formic acid per 100 g of resin solids, 0.7 parts tin (as dibutyltindilaurate) and dilution with deionized water to a solids content of 15%. A film, deposited on zinc-phosphated steel, cured at 150° C., with a film thickness of about 20 $\mu$m has a resistance to methylethylketone of about 200 double rubs. A pigmented paint prepared from 100 parts resin solids, 1.5 parts carbon black, 146 parts titanium dioxide, 12.5 parts basic lead silico-chromate, 0.7 parts tin as dibutyltindilaurate and deionized water in a quantity to provide a solids content of 18% provides a film on zinc-phosphated steel which, when cured at 150° C. for 20 minutes has a thickness of 22 +2 $\mu$m with a salt spray resistance (ASTM-B-117-73) of over 1500 hours.

Example 2

576 parts (2 moles) of a secondary amine obtained through reaction of 1 mole of dimethylaminopropylamine with 1 mole of 2-ethylhexylglycidyl ether are reacted as described in Example 1 at 30° to 50° C. in the presence of 507 parts xylol, while cooling, with 608 parts (2 moles) of a toluylene diisocyanate semi-blocked with 2-ethylhexanol. After addition of 66 parts (2 moles) paraformaldehyde (91% $CH_2O$), the batch is held at 70° to 80° C. for 30 to 45 minutes; then, 228 parts (1 mole) of bisphenol-A and 60 parts xylol are added. With the temperature slowly being raised to 140° C., the reaction water which is formed is entrained azeotropically and subsequently the xylol is vacuum-stripped. The batch is diluted to 80% solids with methoxypropanol.

The phenolic hydroxy groups are etherified at 90 to 95° C. with 679 parts of the epoxy resin solution used in Example 1 and with 186 parts (1 mole) 2-ethylhexylglycidyl ether until all epoxy groups have reacted. After addition of 60 milliMoles formic acid per 100 g of resin solids, the product is soluble in water.

Further processing and testing is carried out as described in Example 1. The results are substantially comparable.

EXAMPLE 3

A phenol condensate designated PCA is prepared as follows: 33 parts (1 mole) of paraformaldehyde (91% $CH_2O$) are added at 75° C., with slight cooling, to a blend of 220 parts (1 mole) of nonylphenol, 130 parts (1 mole) of diethylaminopropylamine, and 100 parts toluol. The temperature is slowly raised until a continuous azeotropic distillation has set up. After the separation of 21 parts of reaction water, the product is dissolved in 167 parts toluol. At 30° to 40° C., while cooling, 304 parts (1 mole) of a toluylene diisocyanate semi-blocked with 2-ethylhexanol is added and a temperature of 40° C. is held until an NCO-value of zero is attained.

533 parts toluol are added to 484 parts (1 mole) of a secondary amine obtained through reaction of 1 mole hexamethylene diamine with 2 moles of dodecene oxide. Then 760 parts (2 moles) of an isophorone diisocyanate semi-blocked with isodecyl alcohol are added in portions at 30° to 40° C. while cooling. After the end of the addition, the batch is held at 40° C. for another 90 minutes. Then, 1866 parts, corresponding to 2 moles of phenolic hydroxy groups, of the phenol condensate PCA described above and 66 parts (2 moles) of paraformaldehyde (91% CH$_2$O) are added, and the reaction water is removed azeotropically at from 90° to 130° C.

The partial etherification of the phenolic hydroxy groups is carried out with 1357 parts of a 70% solution in diethyleneglycol dimethylether of an epoxy resin based on bisphenol-A and epichlorohydrin (epoxy equivalent weight about 950) at 95° to 100° C. until all epoxy groups have reacted. The resulting binder is water-soluble upon addition of 45 milliMoles of acetic acid per 100 g of resin solids.

Processing and testing is carried out as described in Example 1. Coatings cured at 160° C. perform similarly to the product obtained according to Example 1.

EXAMPLE 4

The phenol condensate designated PCB is prepared as follows: As described in Example 3, 228 parts (1 mole) of bisphenol-A are reacted with 260 parts (2 moles) diethylaminopropylamine and 66 parts (2 moles) paraformaldehyde (91% CH$_2$O) in the presence of 294 parts toluol as azeotropic entraining agent until 42 parts reaction water have separated. After cooling to 30° C., 760 parts (2 moles) of an isophoronediisocyanate semi-blocked with isodecyl alcohol are added within 45 minutes. As soon as an NCO-value of practically zero is attained, the product is diluted with 210 parts methylisobutylketone.

2013 parts (corresponding to about 2 moles of NH-groups) of a 60% solution in toluol of a secondary amine obtained through the reaction of 1 mole of a bisphenol-A/epichlorohydrin diepoxy resin (epoxy equivalent weight about 475) with 2 moles of 2-ethylhexylamine are blended at 30° to 40° C. through addition in portions with 760 parts (2 moles) of an isophorone diisocyanate semi-blocked with isodecyl alcohol. After the end of the addition, the blend is held at 40° C. for about 1 hour. After the addition of 888 parts (0.5 moles, corresponding to 1 mole of formaldehyde-reactive sites) of phenol condensate PCB described above and 66 parts (2 moles) paraformaldehyde (91% CH$_2$O), the temperature is slowly raised until the reaction water forming at the continuous azeotropic distillation has been removed. Then the phenolic hydroxy groups are reacted at 95° to 100° C. with 368 parts (2 moles) of dodecene oxide. The toluol is vacuum-stripped and the batch is diluted to 70% solids with ethoxypropanol. Upon addition of 40 milliMoles of acetic acid per 100 g of resin solids and dilution with water, a stable clear varnish is obtained. Further processing and testing is carried out as outlined in Example 1. The performance according to the evaluation is similar to that of the product obtained in Example 1.

EXAMPLE 5

576 parts (corresponding to 2 moles NH-groups) of a secondary amine obtained through reaction of 1 mole dimethylaminopropylamine with 1 mole 2-ethylhexyl glycidyl ether are reacted in the presence of 60 parts toluol with 210 parts (1 mole) trimethylhexamethylene diisocyanate at 30° to 40° C. while cooling. As soon as an NCO-value of practically zero is attained, 300 parts (2 moles) p-tert. butylphenol and 66 parts (2 moles) paraformaldehyde (91% CH$_2$O) are added, and the temperature is slowly raised to 130° C., until a continuous azeotropic distillation is attained. After stripping the toluol, the batch is diluted with diethyleneglycol-dimethylether to a solids content of 70%. Then the phenolic hydroxy groups are etherified at 95° to 100° C. with 186 parts (1 mole) 2-ethylhexylglycidyl ether and 475 parts (0.5 moles) of a bisphenol-A/epichlorohydrin epoxy resin.

In order to introduce a hardening component, the batch is reacted at 60° to 70° C. with 912 parts (3 moles) of a toluylene diisocyanate semi-blocked with 2-ethylhexanol. After addition of 40 milliMoles acetic acid per 100 g resin solids, the resulting product is soluble in water.

Further processing and evaluation is carried out as described in Example 1. Coatings stoved at 160° C. for 25 minutes show properties substantially equal to those of Example 1.

As will be apparent to one skilled in the art, various modifications can be made within the scope of the aforesaid description. Such modifications being within the ability of one skilled in the art form a part of the present invention and are embraced by the appended claims.

It is claimed:

1. A process for producing cationic paint binders water-dilutable on protonation comprising (A) reacting an isocyanate compound having at least one free NCO-group with a secondary non-aromatic amine to provide a substituted urea, the quantity of said amine utilized being equivalent to the said free isocyanate groups; and (B) condensing the substituted urea of (A) with formaldehyde and a phenol to form a condensate.

2. The process of claim 1 wherein the phenolic hydroxy groups of said condensate phenol are partially or totally etherified with epoxy compounds.

3. The process of claims 1 or 2 wherein said isocyanate compound in addition to said free isocyanate group carries blocked NCO-groups.

4. The process of claims 1, 2 or 3 wherein said secondary non-aromatic amine is an aliphatic amine.

5. The process of claim 4 wherein said aliphatic amine carries ketimine-blocked primary amino groups.

6. The process of claim 4 wherein said secondary aliphatic amine is a secondary alkanolamine.

7. The process of claim 6 wherein the secondary alkanolamine is the reaction product of monoalkyl- or monoalkanolamines with an epoxy compound.

8. The process of claim 6 wherein the secondary alkanolamine is the reaction product of acrylic acid esters with a primary amine substituted alkanediol.

9. The process of claim 6 wherein the secondary alkanolamine is the reaction product of diprimary diamines with monoepoxy compounds.

10. The process of claims 1, 2, 3 or 4 wherein the phenol in (B) is a phenol-aldehyde condensate carrying at least one formaldehyde-reactive site.

11. The process of claims 1, 2, 3 or 4 wherein the phenol in (B) is an aminoalkylation product of phenols carrying at least one formaldehyde-reactive site.

12. The process of claim 1 wherein the reaction product of the process has a titratable basicity corresponding to an amine value of at least 20 mg KOH/g.

13. The process of claim 12 wherein the amine value is at least 35 mg KOH/g.

14. A cathodically depositable electrodeposition paint comprising a binder produced according to claim 1.

15. Cationic paint binders water-dilutable on protonation comprising the condensation product of a substituted urea with formaldehyde and a phenol, wherein the substituted urea is the reaction product of an isocyanate compound having at least one free NCO-group with a secondary non-aromatic amine, the quantity of said amine utilized being equivalent to the said free isocyanate groups.

16. The cationic paint binder of claim 15 wherein the phenolic hydroxy groups of said condensation product are partially or totally etherified with epoxy compounds.

17. The cationic paint binder of claims 15 or 16 wherein said isocyanate compound in addition to said free isocyanate group carries blocked NCO-groups.

18. The cationic paint binder of claims 15, 16 or 17 wherein said secondary non-aromatic amine is an aliphatic amine.

19. The cationic paint binder of claim 18 wherein said aliphatic amine carries ketimine-blocked primary amino groups.

20. The cationic paint binder of claim 18 wherein said secondary aliphatic amine is a secondary alkanolamine.

21. The cationic paint binder of claim 20 wherein the secondary alkanolamine is the reaction product of monoalkyl- or monoalkanolamines with an epoxy compound.

22. The cationic paint binder of claim 20 wherein the secondary alkanolamine is the reaction product of acrylic acid esters with a primary amine substituted alkanediol.

23. The cationic paint binder of claim 20 wherein the secondary alkanolamine is the reaction product of diprimary diamines with monoepoxy compounds.

24. The cationic paint binder of claims 15, 16, 17 or 18 wherein the phenol is a phenol-aldehyde condensate carrying at least one formaldehyde-reactive site.

25. The cationic paint binder of claims 15, 16, 17 or 18 wherein the phenol is an aminoalkylation product of phenols carrying at least one formaldehyde-reactive site.

26. The cationic paint binder of claim 15 wherein the reaction product has a titratable basicity corresponding to an amine value of at least 20 mg KOH/g.

27. The cationic paint binder of claim 26 wherein the amine value is at least 35 mg KOH/g.

28. A cathodically depositable electrodeposition paint comprising the binder of claim 15.

* * * * *